US010613323B1

(12) United States Patent
Wheelwright et al.

(10) Patent No.: US 10,613,323 B1
(45) Date of Patent: Apr. 7, 2020

(54) TRANSITION FEATURE FOR FRAMING MULTIZONE OPTICS

(71) Applicant: Facebook Technologies, LLC, Menlo Park, CA (US)

(72) Inventors: Brian Wheelwright, Sammamish, WA (US); Ying Geng, Sammamish, WA (US); Jacques Gollier, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/841,184

(22) Filed: Dec. 13, 2017

(51) Int. Cl.
  *G02B 27/00* (2006.01)
  *G02B 7/04* (2006.01)
  *G02B 3/08* (2006.01)
  *H04N 5/33* (2006.01)

(52) U.S. Cl.
  CPC .......... *G02B 27/0025* (2013.01); *G02B 3/08* (2013.01); *G02B 7/04* (2013.01); *G02B 27/0093* (2013.01); *H04N 5/33* (2013.01)

(58) Field of Classification Search
  CPC .. G02B 27/0025; G02B 27/0093; G02B 3/08; G02B 7/04; H04N 5/33
  See application file for complete search history.

(56) References Cited

U.S. PATENT DOCUMENTS

| | | | | | |
|---|---|---|---|---|---|
| 5,270,748 | A | * | 12/1993 | Katz | G02B 27/0093 351/209 |
| 2009/0073386 | A1 | * | 3/2009 | Petito | G02B 27/0172 351/243 |
| 2013/0046381 | A1 | * | 2/2013 | Zalevsky | G02B 5/1895 623/6.11 |
| 2014/0361977 | A1 | * | 12/2014 | Stafford | G02B 27/0093 345/156 |
| 2015/0198811 | A1 | * | 7/2015 | Hoellwarth | G02B 27/017 345/8 |
| 2015/0312560 | A1 | * | 10/2015 | Deering | G02B 13/0085 345/1.3 |
| 2015/0355462 | A1 | * | 12/2015 | Saito | G02B 27/017 345/419 |
| 2016/0026253 | A1 | * | 1/2016 | Bradski | G02B 27/225 345/8 |
| 2016/0274365 | A1 | * | 9/2016 | Bailey | G02B 27/0093 |
| 2016/0320620 | A1 | * | 11/2016 | Maimone | G06F 3/011 |
| 2017/0102549 | A1 | * | 4/2017 | Lee | G02B 27/0179 |
| 2017/0213388 | A1 | * | 7/2017 | Margolis | H04N 19/139 |
| 2018/0157320 | A1 | * | 6/2018 | Trail | G06F 3/011 |
| 2018/0217377 | A1 | * | 8/2018 | Lam | G02B 27/0172 |
| 2018/0231782 | A1 | * | 8/2018 | Jung | G02B 3/08 |
| 2018/0239423 | A1 | * | 8/2018 | Mardanbegi | A61B 3/113 |

* cited by examiner

Primary Examiner — Ryan A Lubit
(74) Attorney, Agent, or Firm — Fenwick & West LLP (57) ABSTRACT

This present disclosure describes an optics block with a frame element. The optics block includes a set of one or more optical elements with a first region and a second region. The first region has a first optical quality which is above a quality threshold; the second region has a second optical quality which is below the quality threshold. The frame element is coupled to a quality threshold boundary between the first region and the second region and is between the set of one or more optical elements and an eye-box. The frame element directs a user's attention towards the first region of the set of one or more optical elements with the first optical quality and away from the second region of the set of one or more optical elements with the second optical quality.

16 Claims, 4 Drawing Sheets

TRANSITION FEATURE FOR FRAMING MULTIZONE OPTICS

BACKGROUND

The present disclosure generally relates to enhancing viewing experience through framing images from electronic displays.

A conventional artificial reality system includes a headset that provides visual and audio information to the user. With conventional headsets, images are displayed on an electronic display inside a headset to provide simulated environments. Through the use of an optics block, the images displayed by the electronic display are presented to a user of the virtual reality system. However with conventional optics blocks, portions of the image undergo aberrations or other optical distortions which undermine the viewing experience. Specifically in augmented reality (AR), optical distortions in images displayed overlapping with the real world can undermine the augmented reality experience. To provide ideal viewing experiences, the virtual images generated by the headsets need to be appropriately displayed.

SUMMARY

This present disclosure describes an optics block with a frame element. The frame element in conjunction with an optics block enhances a viewing experience through a head-mounted display (HMD). The optics block includes an optical element with a first region of a first range of optical quality and a second region of a second range of optical quality. The first range of optical quality is above a quality threshold with the second range of optical quality below the quality threshold. The frame element is placed along a quality threshold boundary between the first region and the second region, such that it encloses the first region above the quality threshold. The frame element is opaque so as to prevent light from passing through the frame element, thus framing the first region. The frame element can be a component of the HMD or can also be mounted onto the HMD. This also proves useful for directing the user's attention away from portions of the image of a lower optical quality thus improving the viewing experience.

Additionally, the frame element can be a base for additional components within a HMD. The frame element can be useful for mounting eye-tracking components closer to the eye. As such, light sources and cameras can be mounted on the frame element so as to provide more accurate and precise tracking of the eyes.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

An artificial reality systems include a HMD. The HMD includes an electronic display which renders images for the artificial reality. The HMD also contains an optics block which is an optical device that is configured to present the images from the electronic display to a user of the artificial reality system. The optics block with multiple optical components can introduce aberrations or other optical distortions to varying portions of the images as seen by the user. A frame element in conjunction with the optics block enhances the viewing experience by emphasizing portions of the image with a higher optical quality. The frame element is opaque such that it hinders light to pass from the image wherever the frame element is positioned thus framing portions of the image. The frame element is positioned such that it frames portions of the image with a higher optical quality (e.g., contrast). The frame element can be a component of the HMD or can also be a separate modification mounted onto the HMD. This also proves useful for directing the user's attention away from portions of the image of a lower optical quality thus improving the viewing experience. Additionally, the frame element can be a base for additional components within a HMD. The frame element can be useful for mounting eye-tracking components closer to the eye. As such, light sources and cameras can be mounted on the frame element so as to provide more accurate and precise tracking of the eyes.

Figure 1:
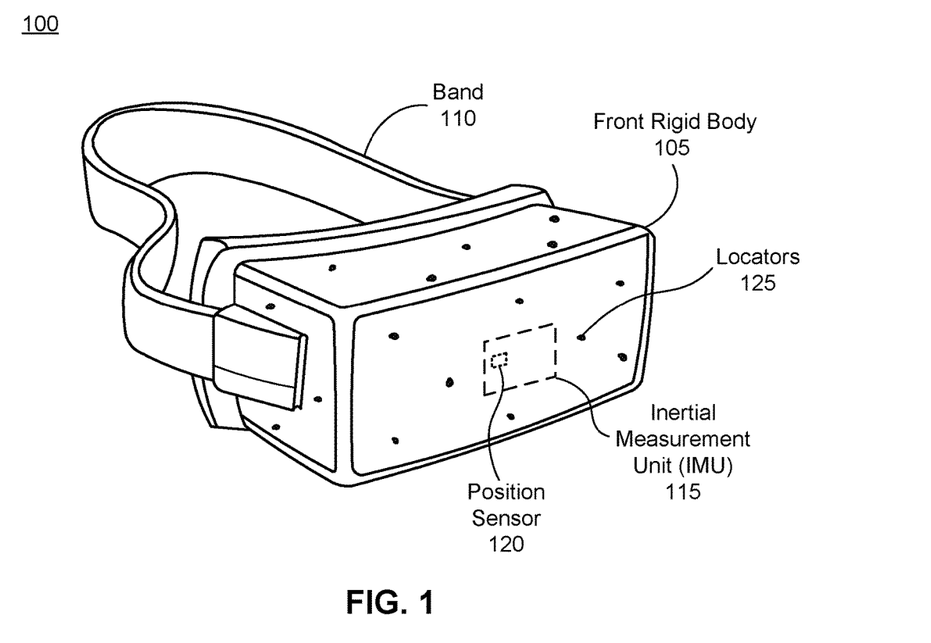
FIG. 1 is a perspective view of a head-mounted display (HMD), in accordance with one or more embodiments.

FIG. 1 is a perspective view of a head-mounted display 100 (HMD 100), in accordance with one or more embodiments. The HMD 100 includes a front rigid body 105 and a band 110. The front rigid body 105 includes one or more electronic display elements of an electronic display (shown in FIG. 2), an optics block (shown in FIG. 2), an inertial measurement unit 115 (IMU 115), a position sensor 120, and the locators 125. In the embodiment shown by FIG. 1, the position sensor 120 is located within the IMU 115, and neither the IMU 115 nor the position sensor 120 are visible to the user. The IMU 115, the position sensor 120, and the locators 125 are discussed in detail below as embodiments of the IMU, position sensors, and locators in FIG. 5. Although the HMD 100 comprises one IMU 115 and one position sensor 120, in other embodiments, there may be additional IMU and/or position sensors. Note in embodiments where the HMD 100 acts as an AR or MR device, portions of the HMD 100 and its internal components are at least partially transparent.

Figure 2:
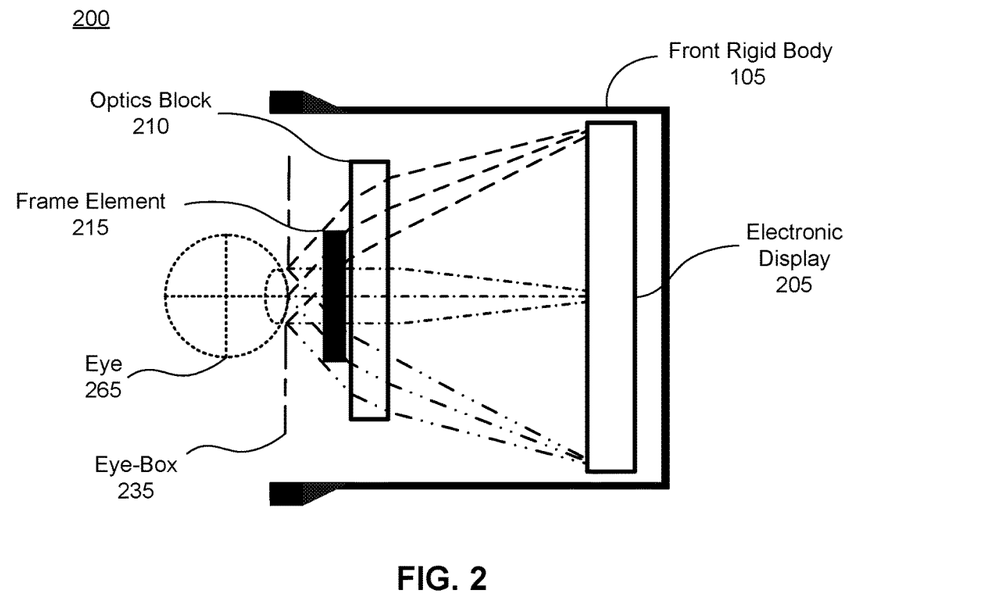
FIG. 2 is a cross sectional view of the front rigid body of the HMD of FIG. 1, in accordance with one or more embodiments.

FIG. 2 is a cross sectional view 200 of the front rigid body 105 of the HMD 100 of FIG. 1, in accordance with one or more embodiments. As shown in FIG. 2, the front rigid body 105 includes an electronic display 205, an optics block 210, and a frame element 215 that all together are incorporated so as to provide image light to an eye-box 235 where a user's eye 265 would be positioned in relation to the front rigid body 105. Viewing the front rigid body 105 from a perspective of the eye-box 235 is defined as a backside view of the front rigid body 105 and the optics block 210. For purposes of illustration, FIG. 2 shows a cross sectional view 200 associated with the single eye 265, but another optics block 210, separate from the optics block 210, provides altered image light to another eye of the user. Additionally, the HMD 100 includes an eye-tracking system described in detail in regards to an embodiment portrayed in FIG. 4. The eye-tracking system may include, e.g., one or more sources that illuminate one or both eyes of the user, and one or more cameras that captures images of one or both eyes of the user.

The electronic display 205 displays images to the user. In various embodiments, the electronic display 205 may comprise a single electronic display or multiple electronic displays (e.g., a display for each eye of a user). Examples of the electronic display 205 include: a liquid crystal display (LCD), an organic light emitting diode (OLED) display, an active-matrix organic light-emitting diode display (AMOLED), a transparent (OLED) display, some other display, or some combination thereof.

The optics block 210 focuses light emitted from the electronic display 205 such that it appears at particular focal distances from the user. The optics block 210 includes one or more optical elements in optical series. An optical element may be configured to dynamically adjust its focus in accordance with instructions from a varifocal system. Example optical elements include Fresnel lenses, spherical lenses, aspherical lenses, convex lenses, concave lenses, waveplates, polarizers, filters, reflectors, dichroic reflectors, etc. In some embodiments, the optics block 210 has an inner zone comprising one type of optical element with a peripheral zone comprising another type of optical element. For example, the inner zone includes an aspherical lens with the peripheral zone including a Fresnel lens. In another example, the inner zone includes a varifocal optical component with the peripheral zone including an optical element with static focus. Due to the one or more optical elements in the optics block 210, a plurality of portions of an image can be defined by threshold degrees of resulting optical quality. Optical quality may be measured in terms of, e.g., modulation transfer function (MTF), amount of aberration (e.g., chromatic, coma, pincushion distortion, barrel distortion, etc.), fixed pattern noise (e.g., screen door effect), vignetting, sharpness, some other measure of image quality, or some combination thereof.

The frame element 215 aids in directing a user's visual attention as well as mounting eye-tracking components. The frame element 215 sits in between the optics block 210 and the user's eye 265. In accordance with this embodiment, the frame element 215 resides within the front rigid body 105 as a component of the HMD 100. In other embodiments, the frame element 215 is a portion of a pair of eye-glasses' frame which can be removeably attachable as an additional feature to a HMD without such frame element 215. The frame element 215 will be further discussed in regards to FIGS. 3 & 4.

In some embodiments, the front rigid body 105 further comprises an eye-tracking system (not shown in FIG. 2) that determines eye-tracking information for the user's eye 265. The determined eye-tracking information may comprise information about an orientation of the user's eye 265 in an eye-box 235, i.e., information about an angle of an eye-gaze. The eye-box 235 representing a three-dimensional volume at an output of a HMD in which the user's eye 265 is located to receive image light. In some embodiments, the eye 265 is illuminated with one or more light sources (e.g., point sources). And the eye-tracking system captures images of the user's eye that include reflections of the light sources on the cornea, and determines a position of the eye 265 based on the captured images. In one embodiment, the user's eye 265 is illuminated with structured light. Then, the eye-tracking system can use locations of the reflected structured light in a captured image to determine eye position and eye-gaze.

In some embodiments, the front rigid body 105 further comprises a varifocal module (not shown in FIG. 2). The varifocal module may adjust focus of one or more images displayed on the electronic display 205, based on the eye-tracking information. In one embodiment, the varifocal module adjusts focus of the displayed images and mitigates vergence-accommodation conflict by adjusting a focal distance of the optics block 210 based on the determined eye-tracking information. In another embodiment, the varifocal module adjusts focus of the displayed images by performing foveated rendering of the one or more images based on the determined eye-tracking information. In yet another embodiment, the varifocal module utilizes the depth information to generate content for presentation on the electronic display 205.

In some embodiments, the front rigid body 105 further comprises an electronic display panel 205 with variable pitch. For example, the display may have larger pixel density at the center of the display, and less pixel density on the periphery. In some embodiments, the display may also have a variable screen door reduction film on it.

Figure 3:
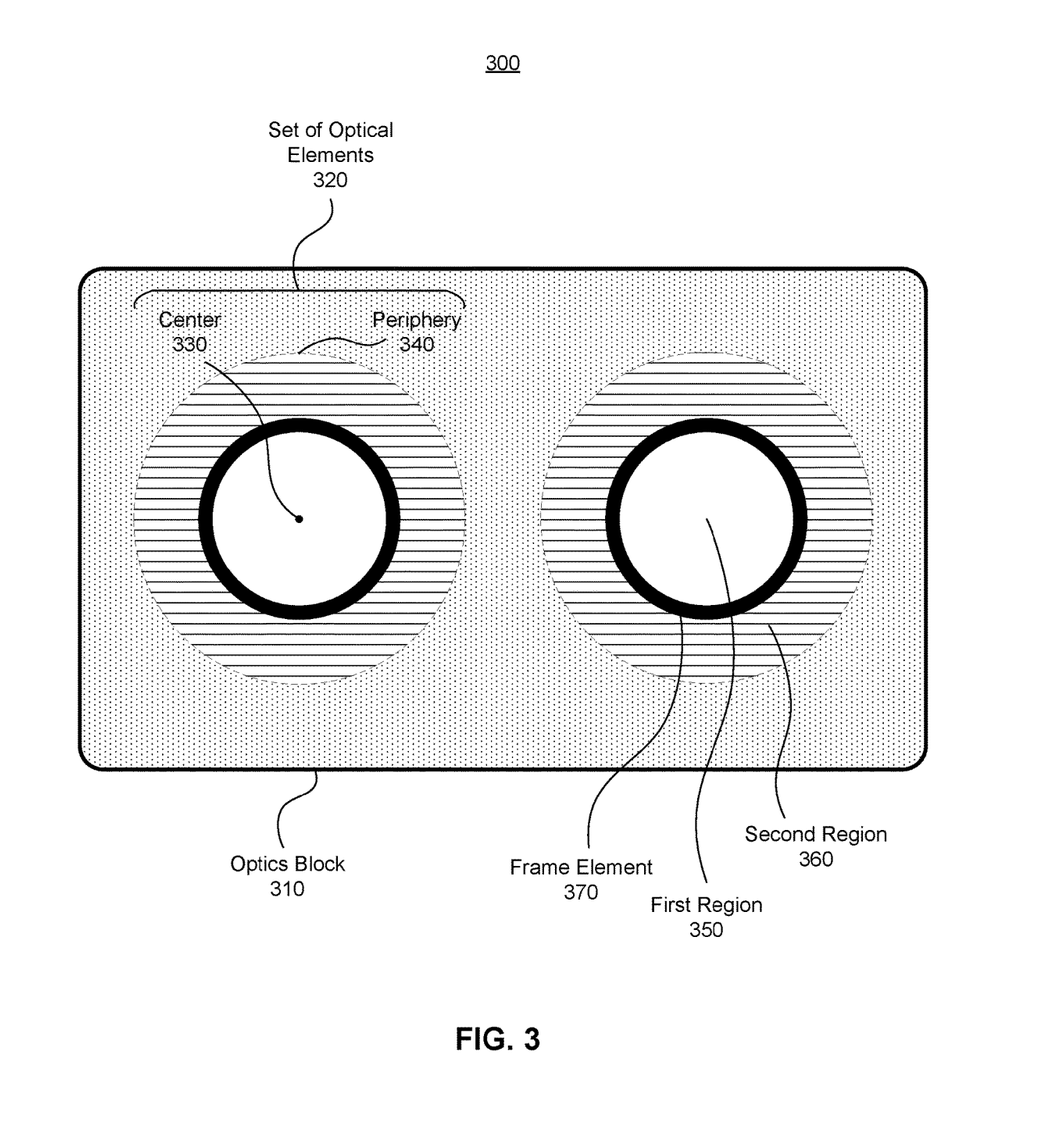
FIG. 3 is a backside view of an optics block with a frame element, in accordance with one or more embodiments.

FIG. 3 is a backside view 300 of an optics block 310 with a frame element 370, in accordance with one or more embodiments. The backside view 300 of the optics block 310 represents a perspective from an eye-box where the optics block 310 directs light from an electronic display (not shown in FIG. 3). The optics block 310 is a component of a front rigid body of a HMD. As seen through the optics block 310, light passes through each of two sets of one or more optical elements 320 (one for each eye of a user, discussion pertains to both sets of one or more optical elements 320 herein referred to as the set of optical elements 320) from an electronic display. Typically, spherical optics aberration increases as one moves away from a center 330 of the set of optical elements 320 towards a periphery 340 of the set of optical elements 320. Accordingly, optical quality of the set of optical elements 320 is best at its center 330, and degrades as a function of radial distance from the center 330 toward the periphery 340 of the set of optical elements 320. Optical quality may be defined in terms of a modulation transfer function (i.e., an amount of image contrast as a function of spatial frequency), distortion, vignetting, chromatic aberration, some other measure of quality of an optical element, or some combination thereof. While the degradation of optical quality is continuous as a function of radial distance, it can generally be grouped into a first region 350 and a second region 360 separated by a quality threshold boundary. Coupled along the quality threshold boundary of the first region 350 and the second region 360 is the frame element 370, one for each set of optical elements 320 (discussion of the frame element 370 pertains to both frame elements shown in this illustration). The frame element 370 draws the user's eye to maintain attention within the first region 350 while removing attention to the second region 360.

The set of optical elements 320 is one component of the optics block 310 which directs light from an electronic display (not shown in FIG. 3). The set of optical elements 320 comprises optical elements as embodiments of optical elements as described in FIG. 2; therefore, the detailed description of optical elements of the set of optical elements 320 is omitted herein. In other embodiments, the optics block 310 includes additional or fewer optical elements which vary the optical quality than described herein this embodiment.

The first region 350 is a region of the set of optical elements 320 that has an optical quality above a threshold value, in accordance with an embodiment. The second region 360 is a region of the set of optical elements 320 that has an optical quality below a threshold value, in accordance with the embodiment. The first region 350 and the second region 360 do not overlap, but there is a quality threshold boundary between the first region 350 and the second region 360. Given that the set of optical elements 320 is circular in this embodiment, the second region 360 extends radially from the first region 350 towards the periphery 340 of the set of optical elements 320 to form an annulus region which is adjacent to the first region 350. In this example embodiment, the quality threshold boundary is a circle which fully encircles the first region 350 separating the first region 350 and the second region 360 based on the threshold value. In other embodiments, the optics block may include one or more optical elements that have geometries that result in a non-rotationally symmetric quality threshold boundary value (e.g., more rectangular). The threshold boundary value in some embodiments may vary with azimuth angle, falling within a band of values, thereby defining a quality threshold boundary with a non-circular shape.

The frame element 370 frames a portion of an image through the optics block 310. The frame element 370 lies along the quality threshold boundary between the first region 350 and the second region 360 such that the frame element 370 encloses the first region 350, in accordance with this embodiment. In enclosing the first region 350, the frame element 370 provides a visual barrier to a user between the first region 350 and the second region 360. As the user's eyes receive light from the optics block 310, the frame element 370 draws the user's eyes to maintain attention within the first region 350. As the first region 350 is above the threshold optical quality, the frame element 370 is useful to direct the user's visual attention towards a portion of the image of an ideal optical quality. In a complementary fashion, the frame element 370 is useful to direct the user's visual attention away from a portion of the image with not so ideal optical quality or a portion of the image which falls below a threshold optical quality, e.g., such as the second region 360. As the frame element 370 lies closest to the user's eyes, the frame element 370 is in a different focal plane than the light oriented by the optical element 355 from the electronic display. Thus the frame element 370 is out-of-focus to the user as the user's eyes are focused on images from the electronic display. In accordance with this embodiment, the frame element 370 has a thickness of at most five millimeters. In other embodiments, the frame element 370 has some other order of thickness. In accordance with this embodiment, the frame element 370 is composed of an opaque material. The opacity of the material aids in directing the user's visual attention. In other embodiments, the composition and the dimensions of the frame element 370 can vary. In other embodiments, the frame element is transparent and has optical prescription of its own, or has the same optical prescription as the center 330 or the periphery 340. In some embodiments, the shape of the frame element may not be round, but can be of different shapes, some matching the frame of typical eyeglasses.

Figure 4:
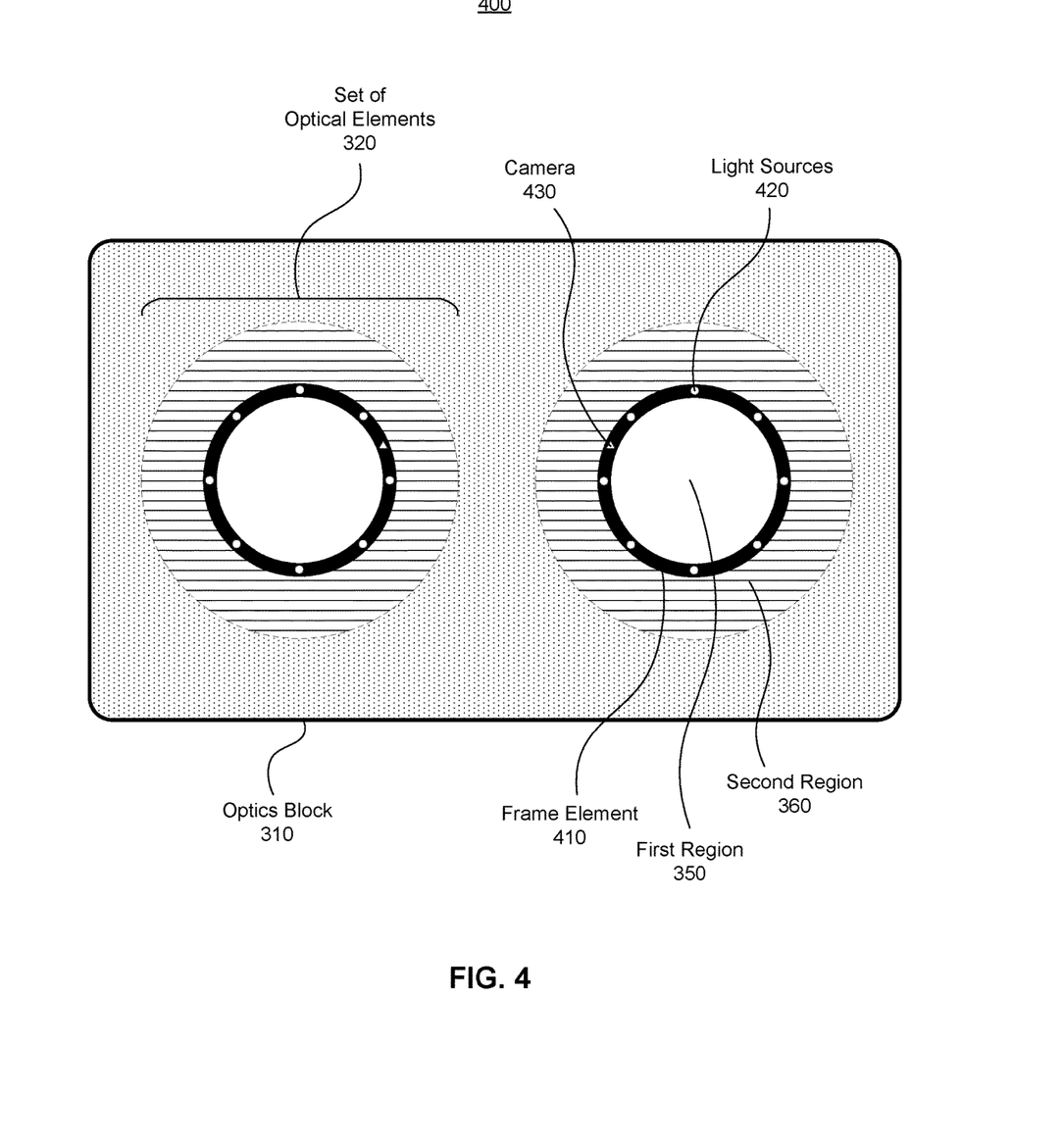
FIG. 4 is a backside view of the optics block of FIG. 3 with eye-tracking components mounted on a frame element, in accordance with one or more embodiments.

FIG. 4 is a backside view 400 of the optics block 310 of FIG. 3 with eye-tracking components mounted on a frame element 410, in accordance with one or more embodiments. Similar to the optics block 310 described above in regards to FIG. 3A, the optics block 310 is a component of a front rigid body of a HMD. As seen through the backside view 400 of the optics block 310, light passes through each of two sets of optical elements 320 (one for each eye of a user, discussion which follows pertains to both sets of optical elements 320) from an electronic display (not shown in FIG. 4). Differing from the frame element 370 of the optics block 310, the frame element 410 of the optics block 310 has eye-tracking components mounted on the frame element 410 including light sources 420 and a camera 430.

The light sources 420 illuminate a portion of a user's eye (not shown in FIG. 4) for tracking movement of the eye. The portion of the user's eye that light is directed to can be, e.g., cornea, iris, sclera, or any combination thereof. The light sources 420 are mounted on the frame element 410 which puts the light sources 420 on a focal plane close to that of the frame element 410. The focal plane with the light sources 420 is also out-of-focus to the user as is the focal plane with the frame element 410. Mounting the light sources 420 on the frame element 410 is closer to the center of the set of optical elements 320, than if the light sources 420 were mounted on the optics block 310 exterior to the set of optical elements 320. Thus light emitted by the light sources 420 travels a lesser distance compared to light emitted by light sources mounted on the optics block 310 exterior to the set of optical elements 320. The light sources 420 are configured to emit light in the visible band (~380 nm to 750 nm), in the infrared (IR) band (~750 nm to 1700 nm), in the ultraviolet band (10 nm to 380 nm), some other portion of the electromagnetic spectrum, or some combination thereof. Embodiments with the light sources 420 emitting in the IR band provide light emitted which is not visible to the user. In accordance with this illustration, the light sources 420 are arranged in a ring around the frame element 410 which is circular. In other embodiments, the light sources 420 are placed unevenly around the frame element 410. In some embodiments, the light sources 420 are light emitting diodes (LEDs), micro LEDs, laser diodes, tunable lasers, organic LEDs, or some combination thereof. In some embodiments, the light sources 420 emit structured light. In some embodiments, the linear dimension of the light sources is smaller than 200 microns.

The camera 430 captures light reflected from the portion of the user's eye for tracking movement of the eye. Light emitted by the light sources 420 reflects off of portions of the user's eye (e.g., cornea, iris, and/or sclera). The camera 430 captures reflected light and converts the reflected light into light signals of various intensities. Differences in light signals over time correspond to movement of the user's eye. Mounting the camera 430 on the frame element 410 places the camera 430 closer to the center of the user's eye. This increases accuracy in capturing light reflected from portions of the user's eye as an angle of reflection from normal is lessened thus decreasing loss of signal. The camera 430 is configured to detect light in the visible band (~380 nm to 750 nm), in the infrared (IR) band (~750 nm to 1700 nm), in the ultraviolet band (10 nm to 380 nm), some other portion of the electromagnetic spectrum, or some combination thereof. The preferred embodiment has the camera 430 detecting in the same band as emitted by the light sources 420, e.g., in the IR band. In some embodiments, the light sources 420 emit structured light such that the camera 430 captures locations of the reflected structured light for determining eye orientation and eye position. In additional configurations, there are additional cameras such as the camera 430 mounted on the frame element 410. In some embodiments, a controller (not shown) collects the light signal from the camera 430 and calculates movement of the user's eye. In additional configurations, the controller may determine and track a three-dimensional (3D) orientation of the user's eye and a 3D position of the eye in the eye-box (not shown).

System Environment

Figure 5:
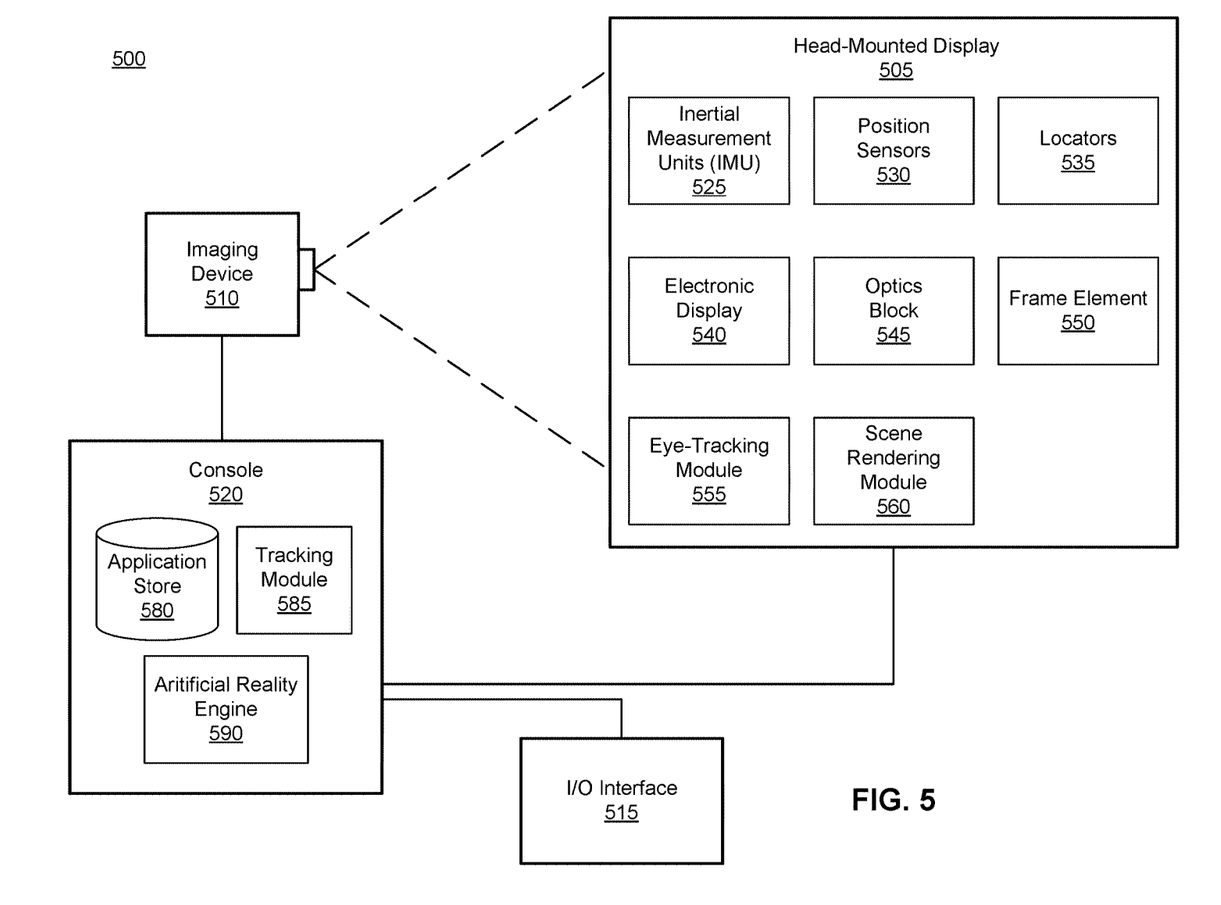
FIG. 5 is a block diagram of a system environment including a HMD system, in accordance with one or more embodiments.

FIG. 5 is a block diagram of a system environment including a HMD system 500, in accordance with one or more embodiments. The HMD system 500 may operate as an artificial reality system, e.g., VR system, an AR system, a MR system, or some combination thereof. The HMD system 500 shown by FIG. 5 comprises a HMD 505, an imaging device 510, and an input/output (I/O) interface 515 that is coupled to a console 520. While FIG. 5 shows an example HMD system 500 including one HMD 505, one imaging device 510, and one I/O interface 515, in other embodiments any number of these components may be included in the HMD system 500. For example, there may be multiple HMDs 505 each having an associated I/O interface 515, with each HMD 505 and I/O interface 515 communicating with the console 510. In alternative configurations, different and/or additional components may be included in the HMD system 500. Additionally, functionality described in conjunction with one or more of the components shown in FIG. 5 may be distributed among the components in a different manner than described in conjunction with FIG. 5 in some embodiments. For example, some or all of the functionality of the console 520 is provided by the HMD 505.

The HMD 505 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 505, the console 520, or both, and presents audio data based on the audio information. The HMD 100 as described in FIGS. 1-4 is an embodiment of the HMD 505. The HMD 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

The HMD 505 includes one or more inertial measurement units (IMU) 525, one or more position sensors 530, locators 535, an electronic display 540, an optics block 545, a frame element 550, and a scene rendering module 560. Some embodiments of the HMD 505 have different components than those described in conjunction with FIG. 5, e.g., the HMD 505 additionally includes an eye-tracking module 555. Although the HMD 505 The IMU 115, the positions sensor 120, and the locators 125 of FIG. 1 are embodiments of the one or more IMU 525, the one or more positions sensors 530, and the locators 535 respectively. In some embodiments, the electronic display 210 of FIG. 2 is a display panel of the electronic display 540 and the optics block 215 of FIG. 2 is the optics block 545. The frame element 370 of FIG. 3 and the frame element 410 of FIG. 4 are embodiments of the frame element 550. Additionally, the functionality provided by various components described in conjunction with FIG. 5 may be differently distributed among the components of the HMD 505 in other embodiments.

The IMU 525 is an electronic device that generates IMU data based on measurement signals received from one or more of the position sensors 530, which generate one or more measurement signals in response to motion of HMD 505. Examples of the position sensors 530 include accelerometers, gyroscopes, magnetometers, other sensors suitable for detecting motion, correcting error associated with the IMU 525, or some combination thereof. The position sensors 530 may be located external to the IMU 525, internal to the IMU 525, or some combination thereof.

Based on the measurement signals from the position sensors 530, the IMU 525 generates IMU data indicating an estimated position of the HMD 505 relative to an initial position of the HMD 505. For example, the position sensors 530 include multiple accelerometers to measure translational motion (forward/back, up/down, left/right) and multiple gyroscopes to measure rotational motion (e.g., pitch, yaw, and roll). The IMU 525 can, for example, rapidly sample the measurement signals and calculate the estimated position of the HMD 505 from the sampled data. For example, the IMU 525 integrates measurement signals received from the accelerometers over time to estimate a velocity vector and integrates the velocity vector over time to determine an estimated position of a reference point on the HMD 505. The reference point is a point that may be used to describe the position of the HMD 505. While the reference point may generally be defined as a point in space, in various embodiments, a reference point is defined as a point within the HMD 505 (e.g., a center of the IMU 525). Alternatively, the IMU 525 provides the sampled measurement signals to the console 320, which determines the IMU data.

The IMU 525 can additionally receive one or more calibration parameters from the console 320. As further discussed below, the one or more calibration parameters are used to maintain tracking of the HMD 505. Based on a received calibration parameter, the IMU 525 may adjust one or more of the IMU parameters (e.g., sample rate). In some embodiments, certain calibration parameters cause the IMU 525 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The locators 535 are objects located in specific positions on the HMD 505 relative to one another and relative to a specific reference point on the HMD 505. A locator 535 may be a light emitting diode (LED), a corner cube reflector, a reflective marker, a type of light source that contrasts with an environment in which the HMD 505 operates, or some combination thereof. Active locators 535 (i.e., an LED or other type of light emitting device) may emit light in the visible band (~380 nm to 450 nm), in the infrared (IR) band (~450 nm to 1 mm), in the ultraviolet band (10 nm to 380 nm), some other portion of the electromagnetic spectrum, or some combination thereof. The locators 535 can be located beneath an outer surface of the HMD 505, which is transparent to the wavelengths of light emitted or reflected by the locators 535 or is thin enough not to substantially attenuate the wavelengths of light emitted or reflected by the locators 535. Further, the outer surface or other portions of the HMD 505 can be opaque in the visible band of wavelengths of light. Thus, the locators 535 may emit light in the IR band while under an outer surface of the HMD 505 that is transparent in the IR band but opaque in the visible band.

The frame element 550 frames a portion of an image through the optics block 545. The frame element 550 aids in focusing a user's visual attention towards regions of the image with higher optical quality. The frame element 550 sits in between the optics block 545 and the user's eye. In accordance with this embodiment, the frame element 550 is a component of the HMD 505. However, in other embodiments, the frame element 550 is an external component which can be removeably coupled to the HMD 505 as an additional feature to the HMD 505 without such frame element 550. In one or more embodiments, the frame element 550 lies along a quality threshold boundary between two regions of varying ranges of optical quality based in part on the optics block 545. One region has a range of optical quality above a threshold value; whereas, the other region has a range of optical quality below a threshold value. In enclosing the region with the range of optical quality above the threshold value, the frame element 550 provides a visual barrier to a user. In a complementary fashion, the frame element 550 is useful to direct the user's visual attention away from the region with the optical quality which falls below the threshold optical quality. Additional embodiments of the frame element 550 provide a base for mounting eye-tracking components which will be discussed in detail below in conjunction with the eye-tracking module 555.

In additional embodiments with the eye-tracking module 555, the eye-tracking module 555 tracks an eye position and eye movement of a user of the HMD 505. A light or other illumination source, (that is part of the eye-tracking module 555) inside the HMD 505, illuminates a user's eye. A camera or other optical sensor, (that is part the eye-tracking module 555) inside the HMD 505, captures image information of the user's eyes, and the eye-tracking module 555 uses the captured information to determine interpupillary distance, interocular distance, a three-dimensional (3D) position of each eye relative to the HMD 505 (e.g., for distortion adjustment purposes), including a magnitude of torsion and rotation (i.e., roll, pitch, and yaw) and gaze directions for each eye. In one example, infrared light is emitted within the HMD 505 and reflected from each eye. The reflected light is received or detected by the camera and analyzed to extract eye rotation from changes in the infrared light reflected by each eye. Many methods for tracking the eyes of a user can be used by eye-tracking module 555. Accordingly, the eye-tracking module 555 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye-tracking module 555 integrates information from past measurements, measurements identifying a position of a user's head, and 3D information describing a scene presented by the electronic display 540. Thus, information for the position and orientation of the user's eyes is used to determine the gaze point in a virtual scene presented by the HMD 505 where the user is looking. In some embodiments, some or all components of the eye-tracking module 555 are mounted on the frame element 550. Mounting light sources and/or cameras of the eye-tracking module 555 on the frame element 550 places the light sources and/or the cameras closer to the user's eyes. Thus light emitted by the light sources and captured by the cameras for eye-tracking travels a lesser distance compared to light emitted by light sources and cameras mounted on the optics block 545 and not the frame element 550.

The light sources of the eye-tracking module 555 illuminate a portion of a user's eye (not shown in FIG. 5) for tracking movement of the eye. The portion of the user's eye that light is directed to can be, e.g., cornea, iris, sclera, or any combination thereof. In one or more embodiments, the light sources are mounted on the optics block 545. The light sources are configured to emit light in the visible band (~380 nm to 750 nm), in the infrared (IR) band (~750 nm to 1700 nm), in the ultraviolet band (10 nm to 380 nm), some other portion of the electromagnetic spectrum, or some combination thereof. Embodiments with the light sources emitting in the IR band provide light emitted which is not visible to the user. In some embodiments, the light sources are light emitting diodes (LEDs), micro LEDs, laser diodes, tunable lasers, organic LEDs, or some combination thereof. In some embodiments, the light sources emit structured light. In one or more embodiments, the light sources are coupled to other components of the HMD 505, e.g., the frame element 550.

The one or more cameras of the eye-tracking module 555 capture light reflected from the portion of the user's eye for tracking movement of the eye. Light emitted by the light sources reflects off of portions of the user's eye (e.g., cornea, iris, and/or sclera). The one or more cameras capture the reflected light and convert the reflected light into light signals of various intensities. Differences in light signals over time correspond to movement of the user's eye. The one or more cameras is configured to detect light in the visible band (~380 nm to 750 nm), in the infrared (IR) band (~750 nm to 1700 nm), in the ultraviolet band (10 nm to 380 nm), some other portion of the electromagnetic spectrum, or some combination thereof. In one or more embodiments, the one or more cameras are coupled to other components of the HMD 505, e.g., the frame element 550.

The scene rendering module 560 receives content for the virtual scene from an artificial reality engine 590 and provides the content for display on the electronic display 540. Additionally, the scene rendering module 560 can adjust the content based on information from the eye-tracking module 555, the IMU 525, the position sensors 530, and the locators 535. The scene rendering module 560 determines a portion of the content to be displayed on the electronic display 540 based on one or more of a tracking module 585, the IMU 525, or the position sensors 530, as described further below.

The imaging device 510 generates imaging data in accordance with calibration parameters received from the console 520. Imaging data includes one or more images showing observed positions of the locators 535 that are detectable by imaging device 510. The imaging device 510 may include one or more cameras, one or more video cameras, other devices capable of capturing images including one or more locators 535, or some combination thereof. Additionally, the imaging device 510 may include one or more filters (e.g., for increasing signal to noise ratio). The imaging device 510 is configured to detect light emitted or reflected from the locators 535 in a field of view of the imaging device 510. In embodiments where the locators 535 include passive elements (e.g., a retroreflector), the imaging device 510 may include a light source that illuminates some or all of the locators 535, which retro-reflect the light towards the light source in the imaging device 510. Imaging data is communicated from the imaging device 510 to the console 520, and the imaging device 510 receives one or more calibration parameters from the console 520 to adjust one or more imaging parameters (e.g., focal length, focus, frame rate, ISO, sensor temperature, shutter speed, aperture, etc.).

The I/O interface 515 is a device that allows a user to send action requests to the console 520. An action request is a request to perform a particular action. For example, an action request may be to start or end an application or to perform a particular action within the application. The I/O interface 515 may include one or more input devices. Example input devices include a keyboard, a mouse, a game controller, or any other suitable device for receiving action requests and communicating the received action requests to the console 520. An action request received by the I/O interface 515 is communicated to the console 520, which performs an action corresponding to the action request. In some embodiments, the I/O interface 515 may provide haptic feedback to the user in accordance with instructions received from the console 520. For example, haptic feedback is provided by the I/O interface 515 when an action request is received, or the console 520 communicates instructions to the I/O interface 515 causing the I/O interface 515 to generate haptic feedback when the console 520 performs an action.

The console 520 provides content to the HMD 505 for presentation to the user in accordance with information received from the imaging device 510, the HMD 505, or the I/O interface 515. In the example shown in FIG. 5, the console 520 includes an application store 580, a tracking module 585, and the artificial reality engine 590. Some embodiments of the console 520 have different or additional modules than those described in conjunction with FIG. 5. Similarly, the functions further described below may be distributed among components of the console 520 in a different manner than is described here.

The application store 580 stores one or more applications for execution by the console 520. An application is a group of instructions, that when executed by a processor, generates content for presentation to the user. Content generated by an application may be in response to inputs received from the user via movement of the HMD 505 or the I/O interface 515. Examples of applications include gaming applications, conferencing applications, video playback application, or other suitable applications.

The tracking module 585 calibrates the artificial reality system 500 using one or more calibration parameters and may adjust one or more calibration parameters to reduce error in determining position of the HMD 505. For example, the tracking module 585 adjusts the focus of the imaging device 510 to obtain a more accurate position for observed locators 535 on the HMD 505. Moreover, calibration performed by the tracking module 585 also accounts for information received from the IMU 525. Additionally, if tracking of the HMD 505 is lost (e.g., imaging device 510 loses line of sight of at least a threshold number of locators 535), the tracking module 585 re-calibrates some or all of the artificial reality system 500 components.

Additionally, the tracking module 585 tracks the movement of the HMD 505 using imaging information from the imaging device 510 and determines positions of a reference point on the HMD 505 using observed locators from the imaging information and a model of the HMD 505. The tracking module 585 also determines positions of the reference point on the HMD 505 using position information from the IMU information from the IMU 525 on the HMD 505. Additionally, the tracking module 585 may use portions of the IMU information, the imaging information, or some combination thereof, to predict a future location of the HMD 505, which is provided to the artificial reality engine 590.

The artificial reality engine 590 executes applications within the artificial reality system 500 and receives position information, acceleration information, velocity information, predicted future positions, or some combination thereof for the HMD 505 from the tracking module 585. Based on the received information, the artificial reality engine 590 determines content to provide to the HMD 505 for presentation to the user, such as a virtual scene, one or more virtual objects to overlay onto a real world scene, etc.

Additionally, the artificial reality engine 590 performs an action within an application executing on the console 520 in response to an action request received from the I/O interface 515 and provides feedback to the user that the action was performed. The provided feedback may be visual or audible feedback via the HMD 505 or haptic feedback via the I/O interface 515.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optics block comprising:
a plurality of lenses comprising:
a first lens with a first range of optical quality, wherein the first range of optical quality is above a quality threshold, and
a second lens that circumscribes the first lens, the second lens with a second range of optical quality, wherein the second range of optical quality is below the quality threshold, and
wherein the quality threshold is based in part on a target amount of image contrast as a function of spatial frequency, and
wherein the plurality of lenses is configured to direct light emitted from a display to an eye-box.

2. The optics block of claim 1, wherein at least one lens of the plurality of lenses is a Fresnel lens.

3. The optics block of claim 1, further comprising at least one light source that is configured to emit light in an infrared band.

4. The optics block of claim 3, further comprising at least one camera configured to capture light in the infrared band emitted by the at least one light source that is reflected by an eye of a user.

5. The optics block of claim 1, further comprising a plurality of light sources that is configured to emit light in an infrared band, and the plurality of light sources is in a ring configuration.

6. The optics block of claim 1, further comprising an opaque frame element which is located along a quality threshold boundary between the first lens and the second lens and is between the plurality of lenses and the eye-box, wherein the opaque frame element has a thickness that is no more than 5 mm thick.

7. The optics block of claim 6, wherein at least one lens of the plurality of lenses includes a varifocal lens.

8. The optics block of claim 6, wherein the first lens is of a first type, and the second lens is of a second type different than the first type.

9. The optics block of claim 8, wherein the first type is a varifocal lens and the second type is a static focus lens.

10. The optics block of claim 6, wherein the a plurality of lenses is in series.

11. A head-mounted display (HMD) comprising:
an optics block comprising:
a plurality of lenses comprising:
a first lens with a first optical quality, wherein the first optical quality is above a quality threshold, and
a second lens that circumscribes the first lens, the second lens with a second optical quality, wherein the second optical quality is below the quality threshold, and
wherein the quality threshold is based in part on a target amount of image contrast as a function of spatial frequency, and
wherein the plurality of lenses is configured to direct light emitted from a display to an eye-box.

12. The HMD of claim 11, wherein at least one lens of the plurality of lenses is a Fresnel lens.

13. The HMD of claim 11, further comprising at least one light source configured to emit light in an infrared band.

14. The HIVID of claim 13, further comprising at least one camera configured to capture light in the infrared band emitted by the at least one light source and reflected by an eye of a user.

15. The HMD of claim 11, further comprising a plurality of light sources that is configured to emit light in an infrared band, and the plurality of light sources is in a ring configuration.

16. The HMD of claim 11, further comprising an opaque frame element which is located along a quality threshold boundary between the first lens and the second lens and is between the plurality of lenses and the eye-box, wherein the opaque frame element has a thickness that is no more than 5 mm thick.

* * * * *

UNITED STATES PATENT AND TRADEMARK OFFICE
CERTIFICATE OF CORRECTION

PATENT NO. : 10,613,323 B1
APPLICATION NO. : 15/841184
DATED : April 7, 2020
INVENTOR(S) : Brian Wheelwright et al.

Page 1 of 1

It is certified that error appears in the above-identified patent and that said Letters Patent is hereby corrected as shown below:

In the Claims

Column 14, Line 17, Claim 10, after "wherein the", delete "a".

Column 14, Line 36, Claim 14, delete "HIVID" and insert -- HMD --.

Signed and Sealed this
Thirteenth Day of October, 2020

Andrei Iancu
*Director of the United States Patent and Trademark Office*